(12) United States Patent
Levin

(10) Patent No.: US 8,096,230 B2
(45) Date of Patent: Jan. 17, 2012

(54) BREWING ELEMENT WITH A CENTRAL INLET

(76) Inventor: Shalom Levin, Atlit (IL)

(*) Notice: Subject to any disclaimer, the term of this patent is extended or adjusted under 35 U.S.C. 154(b) by 949 days.

(21) Appl. No.: 12/045,742

(22) Filed: Mar. 11, 2008

(65) Prior Publication Data
US 2008/0236401 A1 Oct. 2, 2008

Related U.S. Application Data

(63) Continuation-in-part of application No. 11/814,677, filed on Jul. 25, 2007.

(51) Int. Cl.
*A47J 31/44* (2006.01)
*A47J 31/00* (2006.01)

(52) U.S. Cl. ............ 99/295; 99/302 R; 99/303; 99/322; 99/323.3

(58) Field of Classification Search ............... 99/323.3, 99/323, 295, 300, 302 R, 307, 288; 426/433
See application file for complete search history.

(56) References Cited

U.S. PATENT DOCUMENTS

| | | | |
|---|---|---|---|
| 1,075,727 A | 10/1913 | Reichert | |
| 2,643,027 A * | 6/1953 | Fink | 222/92 |
| 4,382,402 A | 5/1983 | Alvarez | |
| 4,528,218 A * | 7/1985 | Maione | 62/86 |
| 5,272,960 A | 12/1993 | Kinna | |
| 6,202,541 B1 | 3/2001 | Cai | |
| 6,619,188 B1 * | 9/2003 | Meador | 99/295 |
| 6,658,989 B2 | 12/2003 | Sweeney et al. | |
| 6,740,345 B2 | 5/2004 | Cai | |
| 2005/0284302 A1 * | 12/2005 | Levin | 99/275 |
| 2007/0045341 A1 | 3/2007 | Bauer | |

FOREIGN PATENT DOCUMENTS

WO PCT/US00/03725 9/2000

* cited by examiner

*Primary Examiner* — Henry Yuen
*Assistant Examiner* — Jianying Atkisson
(74) *Attorney, Agent, or Firm* — Law Offices of Edward Langer (57) ABSTRACT

A portable beverage preparation device comprising a drink container containing a predetermined volume of a potable base liquid, at least one beverage preparation of a predetermined quantity; at least one sealed compartment for confining the beverage preparation, and a dispenser means for dispersing the at least one beverage preparation into the base liquid within the drink container; wherein the drink container and the at least one sealed compartment are in close physical proximity to each other and separated by at least one thin membrane which, when inwardly perforated by the dispenser means, disperses the at least one beverage preparation into the base liquid to make a beverage ready to drink.

15 Claims, 6 Drawing Sheets

BREWING ELEMENT WITH A CENTRAL INLET

The present application is a Continuation-In-Part (CIP) of U.S. patent application Ser. No. 11/814,677 filed on Jul. 25, 2007 by the Applicant, the disclosure of which is hereby incorporated herein in its entirety by reference.

FIELD OF THE INVENTION

The present invention is related to beverage brewing elements and systems, and in particular, to a self-supporting brewing element with a central inlet disposed within a drinking container and usable in conjunction with espresso machines and portable beverage brewing Systems.

BACKGROUND OF THE INVENTION

Both pod and capsule portafilters used in espresso machines have a cylindrical chamber to hold the ground materials, such as coffee, used in brewing. The cylindrical envelope of this chamber is closed and the top and the base of the cylinder are perforated to allow pressurized water to enter the cylinder from one side flushing axially through the ground coffee and exiting as an espresso beverage from the other, perforated side.

Since the espresso preparation procedure involves the use of high pressure water flushing through the brewing materials, such as ground coffee, and this pressure develops very high axial and radial forces on the internal face of the capsule, a very rigid construction is needed to support the capsule during the preparation process. Such rigid construction increases the cost of producing the brewing machine and the cost to the consumer is like-wise higher.

SUMMARY OF THE INVENTION

Accordingly, it is a broad object of the present invention to overcome the disadvantages and limitations of the prior art by providing a self-supporting brewing element with a central inlet, disposed within a drinking container and usable in conjunction with espresso machines and portable beverage brewing systems.

The present invention improves on the contemporary art by providing a new type of capsule that eliminates the need for rigid and complicated construction of the brewing element or the associated structure, such as a special rigid chamber, which is ordinarily needed to firmly hold the capsule in place in an espresso machine during the preparation process.

Thus there is provided a portable beverage preparation device comprising:

a sealed drink container having a central inlet sealed with a punchable membrane, the container containing a predetermined volume of a potable base liquid;

a capsule brewing element disposed within the container comprising at least one sealed compartment having a predetermined quantity of at least one beverage preparation contained therein; and a dispenser means for dispersing the at least one beverage preparation into the drink container;

such that when the drink container is connected to an operating espresso system, the base liquid is heated therein and returned via the central inlet to the drink container as pressurized liquid, mixing with the at least one beverage preparation, and engorging and stretching the sealed compartment to activate the dispenser means which disperses the mixed brew into the drink container.

The self-supporting, capsule of the present invention is particularly suitable to serve as an integral part of a special disposable cup which contains both a pre-measured amount of potable liquid, such as water, and one or more powdered ingredients, such as coffee, to make either a hot or cold mixed brew.

In one embodiment of the present invention, the capsule comprising the brewing element is toroidal-shaped. In another embodiment of the present invention, the capsule is tubular-shaped and made from aluminum which has ideal characteristics for the purpose of providing a self-supporting brewing element. Both these embodiments share the advantage of being able to withstand high pressure without any external support, so they can be integrated within a plastic cup as self-supporting brewing elements. By definition, use of aluminum in the tubular brewing element makes for an excellent humidity buffer between the water surrounding the tube and the powdered brewing ingredients contained within the tube.

Furthermore, since the tube comprising the brewing element is formed of one piece of aluminum, it can be hermetically and reliably sealed at its open distal end. It does not need an additional part to use as a cover to close this end. Folding the lower, distal end of the tube material upon itself also performs a perfect hermetic sealing of the tube. This new type of capsule will allow the production of a more flexible and greatly simplified mechanism for use in the next generation of espresso machines.

BRIEF DESCRIPTION OF THE DRAWINGS

For a better understanding of the invention with regard to the embodiments thereof reference is made to the accompanying drawings, not to scale, in which like numerals or characters designate corresponding elements or sections throughout and wherein.

DETAILED DESCRIPTION OF THE EMBODIMENTS

Figure 1:
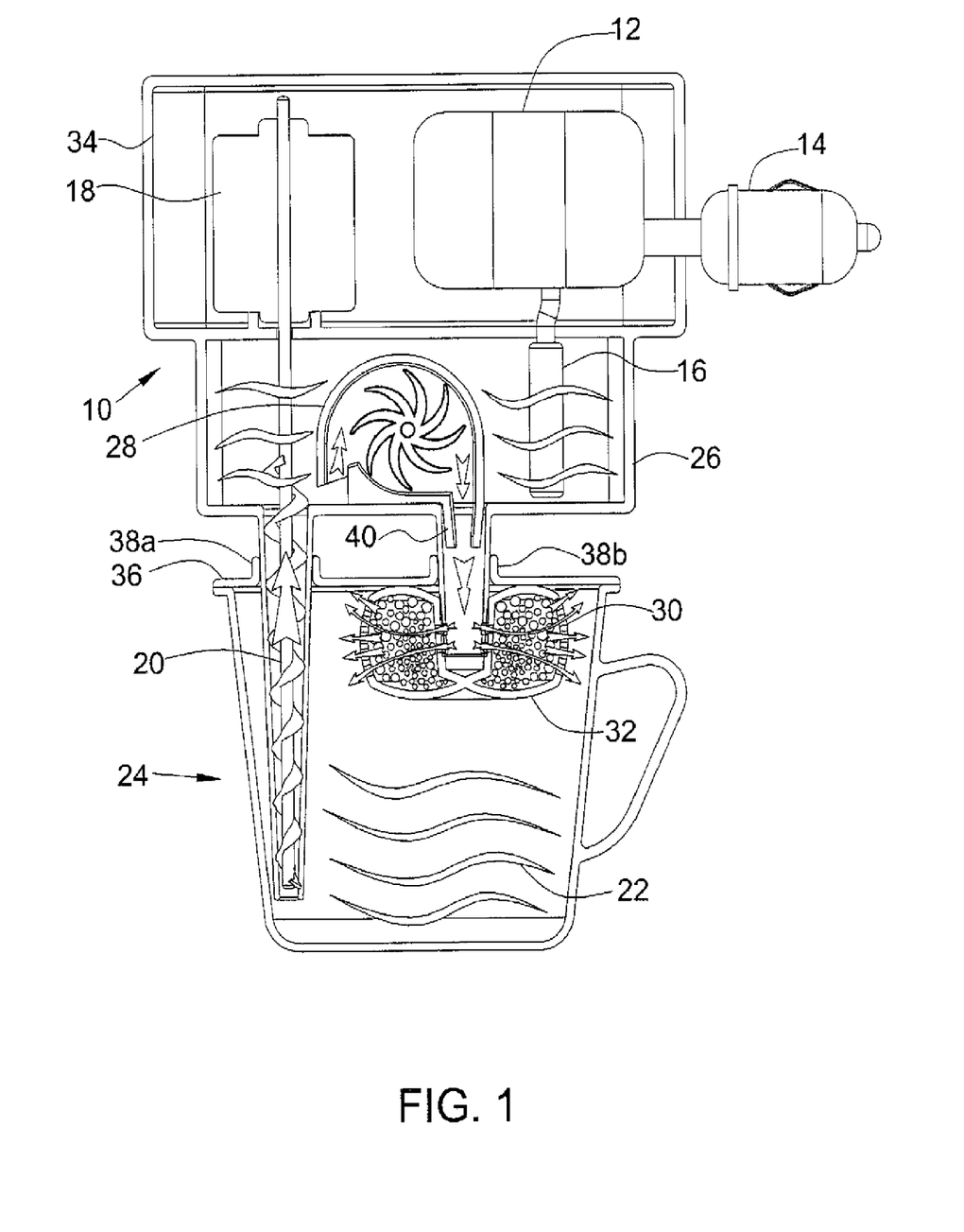
FIG. 1 is a cross-sectional view of an embodiment of the capsule of the present invention shown connected directly to a high-pressure water pump in a portable beverage brewing system.

FIG. 1 is a cross-sectional view of an embodiment of the capsule of the present invention shown connected directly to a high-pressure water pump in a portable beverage brewing system.

The portable beverage brewing system comprises: a power and control unit 12 connected to a power source connector 14, for example, an auto cigarette lighter plug, and connected to a length of heater element 16 for heating the water for making a brew; a water suction pump 18 and suction tube 20 for drawing water 22 (shown as wavy lines) from a container 24, such as a cup, into the hot water pumping section 26; a high pressure pump 28 to create the necessary pressure to flush the water through the inner and outer envelope 30 of a brewing element 32, such as the toroidal capsule in one embodiment of the present invention; and a housing unit 34 for containing the various power and control components of the system which is shown mounted as a sealed unit 10 to the cup 24 where the brew is made.

Note that the sealed unit 10 is removable after the brew has been prepared and may be reused with another beverage brewing cup. The cup 24 is provided with a cover 36 having two inlets 38*a*/*b* to accommodate and attach the housing unit 34 to cup 24. One inlet 38*a* introduces suction tube 20 into cup 24 (and may also be used as a mouthpiece for drinking the prepared brew) while the other admits nozzle 40 into the central bore of the capsule brewing element 32, thus allowing pressurized water to flow (as shown by down arrow) into inlet 38*b* when the components of sealed unit 10 are operating.

Note also that the capsule brewing element 32 is provided with a perforated inner and outer envelope 30 (perforations indicated by arrows exiting capsule brewing element 32) which allows the flushed brew to flow radially outward through the multiple perforations and thus fill cup 24 with a predetermined volume of a heated brew, such as coffee.

Figure 2:
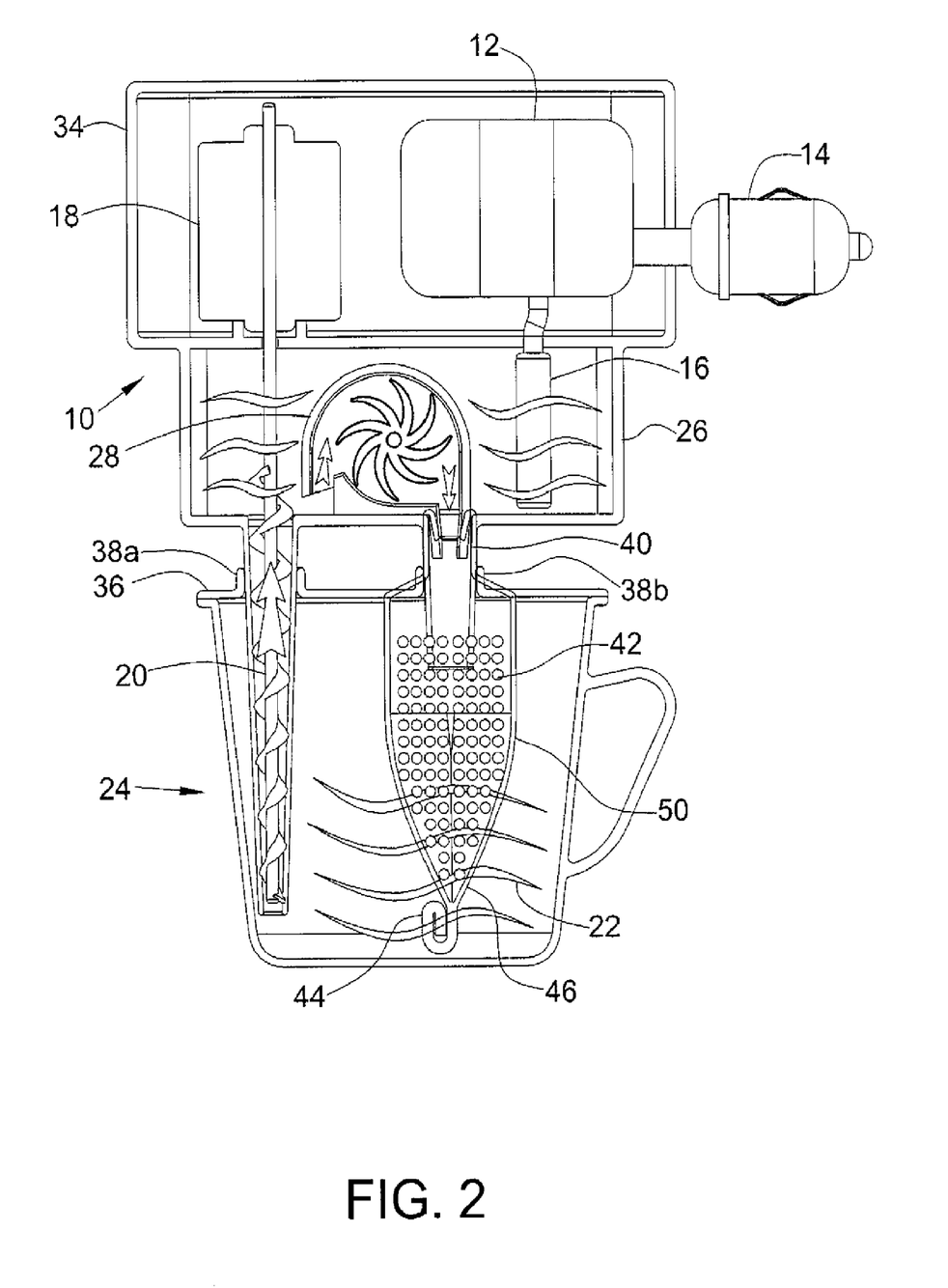
FIG. 2 is a cross-sectional view of another embodiment of the capsule of the present invention shown connected directly to a high-pressure water pump in a portable beverage brewing system.

FIG. 2 is a cross-sectional view of another embodiment of the capsule of the present invention shown connected directly to a high-pressure water pump in a portable beverage brewing system.

A sealed unit 10 comprising a high-pressure water pump 28 is connected to cup 24 and operated essentially as described for the toroid brewing element shown in FIG. 1. The essential difference in this embodiment of the present invention is the use of a unique tubular-shaped brewing element 50 (hereinafter tube 50) containing a pre-measured quantity of at least one brewing ingredient 42. Tube 50 in accordance with a preferred embodiment of the present invention, is substantially, centrally disposed within cup 24, with its narrower, distal end 46 having a fold 44 formed thereon to hermetically seal tube 50. The distal end 46 is oriented downward within cup 24 within a potable liquid, such as treated water 22. This tube 50 is made, in a preferred embodiment of the present invention, of aluminum to take advantage of several, useful characteristics of this material, as described below, in reference to FIG. 3.

Figure 3:
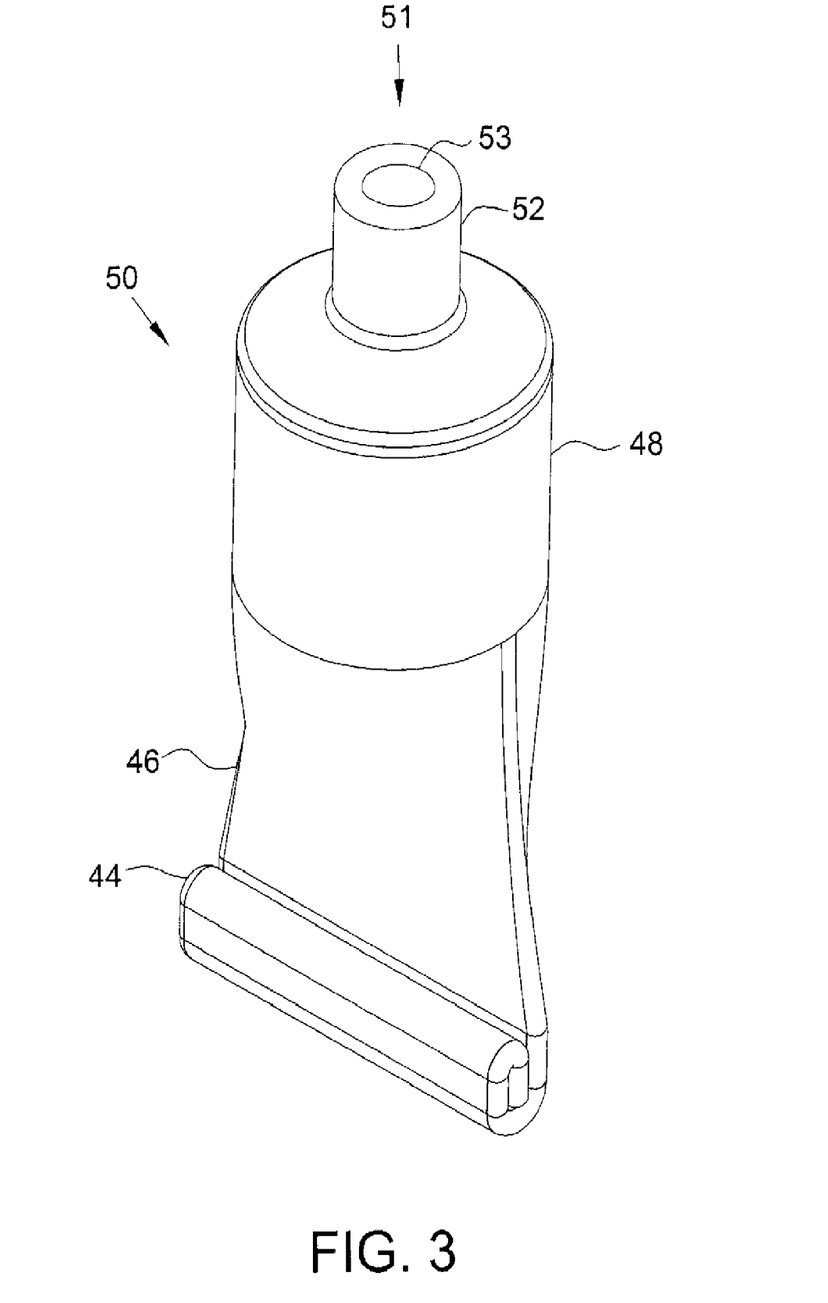
FIG. 3 is a perspective view of the tube brewing element from FIG. 2 formed in accordance with a preferred embodiment of the present invention.

FIG. 3 is a perspective view of the tube brewing element from FIG. 2 formed in accordance with a preferred embodiment of the present invention. The inventive concept is based on a brewing element formed such that the tube diameter is relatively narrow compared with the tube length. In a preferred embodiment of the present invention, tube brewing element 50 comprises a single piece of aluminum material including an inlet tube 52 at its proximal end 48 that is sealed with a thin, punchable membrane 53. It should be noted that in the case of a tube capsule containing—for example, ground coffee—where the tube section is small, there is a more even flow of water through the ground coffee beans, and more water will be in contact with every grain. This is especially important to provide for the rich, full taste of whatever brewing ingredients are used to make a brew.

Membrane 53 is easily punched when, for example, a high-pressure water pump, such as shown in FIG. 2, is mechanically connected to tube 50 (as indicated by arrow 51) through inlet tube 52.

Tube 50 is initially formed open at its other, distal end 46 for filling with one or more brewing ingredients, and then hermetically sealed by simply folding the thin distal end 46 over itself a few times to form folded end 44. The advantage of this is that no special or additional part is needed for closing tube 50.

In some cases the internal wall near distal end 46 has an elastomeric coating for a better sealing when folded. Folded end 44 of tube 50 might also be made crimped or heat-sealed since the aluminum foil material used in a preferred embodiment of the present invention is very thin. Optionally, distal end 46 may be sealed by any means known to those skilled in the art. The brewing material is filled directly into the tube 50 or, alternatively, a unique pre-filled capsule (for example made of plastic with a few vertical and/or horizontal chambers provided therein for storing several comestible materials) is inserted into tube 50.

Figure 4:
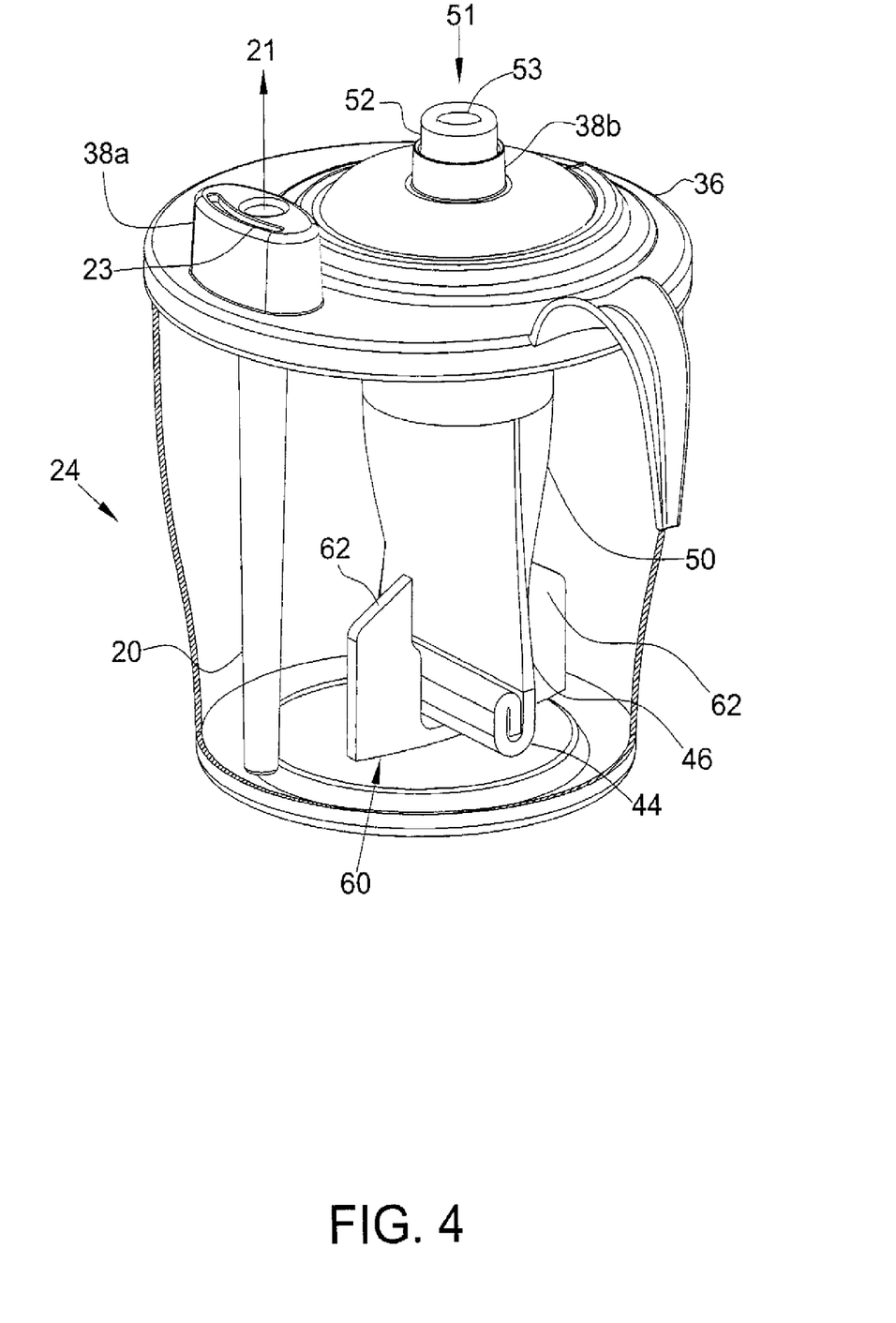
FIG. 4 is a cut-away view showing the disposition of the tube brewing element of FIG. 3 within a cup.

FIG. 4 is a cut-away view showing the disposition of the tube brewing element of FIG. 3 within a cup.

A container, such as cup 24 is sealed with a cover 36 which is advantageously provided with at least one outlet, such as lip 38*a* for drinking the finished brew and which also serves as a portal for a suction tube 20 used to initially pump the potable liquid (not shown) from cup 24 into a heating and pressurizing unit (see FIG. 2). Lip 38*a* is sealed with a thin membrane 23. Cover 36 is also provided with at least one inlet 38*b* which engages inlet tube 52 of tube brewing element 50. Inlet tube 52 is sealed with a thin membrane 53.

The distal end 46 of tube 50 is shown disposed within a pair of "jaws" comprising sharp punching ribs 62 formed integrally to dispenser means 60. In a preferred embodiment of the present invention, at least one pair of opposing punching ribs 62 are provided for puncturing tube 50 to release only the liquid portion, i.e., the mixed brew, from within tube 50 into cup 24.

When hot pressurized liquid, such as water, is injected (indicated by arrow 51) through inlet tube 52, it mixes with one or more brewing ingredients, such as ground coffee, contained within tube 50.

If the pre-filled capsule comprising tube 50 is formed with multiple chambers, it is possible to store several different comestible materials insertable together into tube 50 to make a mixed brew. Additional ingredients for a brew, such as sugar, or a milk powder, can be provided to add flavor to a coffee brew. In another embodiment of the present invention, the brewing material is provided in pre-measured quantities via a pre-filled capsule insertable into tube 50.

The very thin aluminum foil material comprising tube 50 stretches, being engorged by the pressurized water, thus bringing distal end 46 into direct contact with punching ribs 62. The thin aluminum material of tube 50 is then easily perforated when mechanically punched by the sharp punching ribs 62 comprising dispenser means 60, thus releasing the mixed brew through the resulting perforations directly into cup 24.

It should be noted that millions of aluminum tubes are used worldwide every day, predominantly in the pharmaceutical and cosmetic industries, due to their superb barrier properties against humidity, UV chemicals, moisture, and the like. In this preferred embodiment of the present invention, a pure aluminum coin (slug) is used as the raw material for preparing an aluminum tube.

Aluminum tubes are produced in a production process called "reverse impact extrusion". By a very rapid and aggressive cold-forming procedure, the small coin is turned into a thin-walled aluminum tube with a front nipple that is closed, an easy to puncture inlet membrane, and a distal rear end that is open for inserting filling material. After the filling material is injected into the tube, the rear end is simply folded, crimped and hermetically sealed.

There are three main benefits for using an aluminum tube in construction of a brewing element (capsule):

1) The aluminum capsule is made from a single piece of material that is formed into a front nipple having an inlet, a punchable membrane covering the inlet, and a tube. There is no additional part or cover for hermetically sealing the tube after filling it with material, such as ground coffee beans for making an espresso brew. The tube is sealed by simply folding over itself the thin, distal end of the tube.

2) Using a tube to form a brewing capsule brings the state of the art to a new level wherein the capsule is designed without any or only negligible external support so as to withstand the very high water pressure and the effects of high temperatures resulting from its use in espresso machines.

Prior art capsules have been designed in a shape or category of "container", either as a cylindrical container having a diameter about one and a half times its length (for example, 36 mm diameter by 18 mm length), and/or a ball container, a toroidal container, a spherical container, and the like.

In a preferred embodiment of the present invention, the capsule is formed as a tube having a diameter of about 20 mm and a length of about 60 mm. A tube can withstand much higher water pressure than the prior art containers mentioned above and since the tube section is small, the axial force that water exerts on the contents, e.g., ground coffee, is about two times smaller compared to that in prior art capsules.

3) Since the volume of water needed for espresso preparation is very small, the use of large diameter capsules, as in the prior art, may cause the water to not flow evenly through the whole capsule section. For example, the water may flow more in the center and less in the perimeter of the capsule.

In the case of a tube capsule where the tube section is small, a more even flow of water is obtained flowing through the brewing ingredients and water is more likely to come into contact with all or most all of the material comprising the ingredients.

Figure 5:
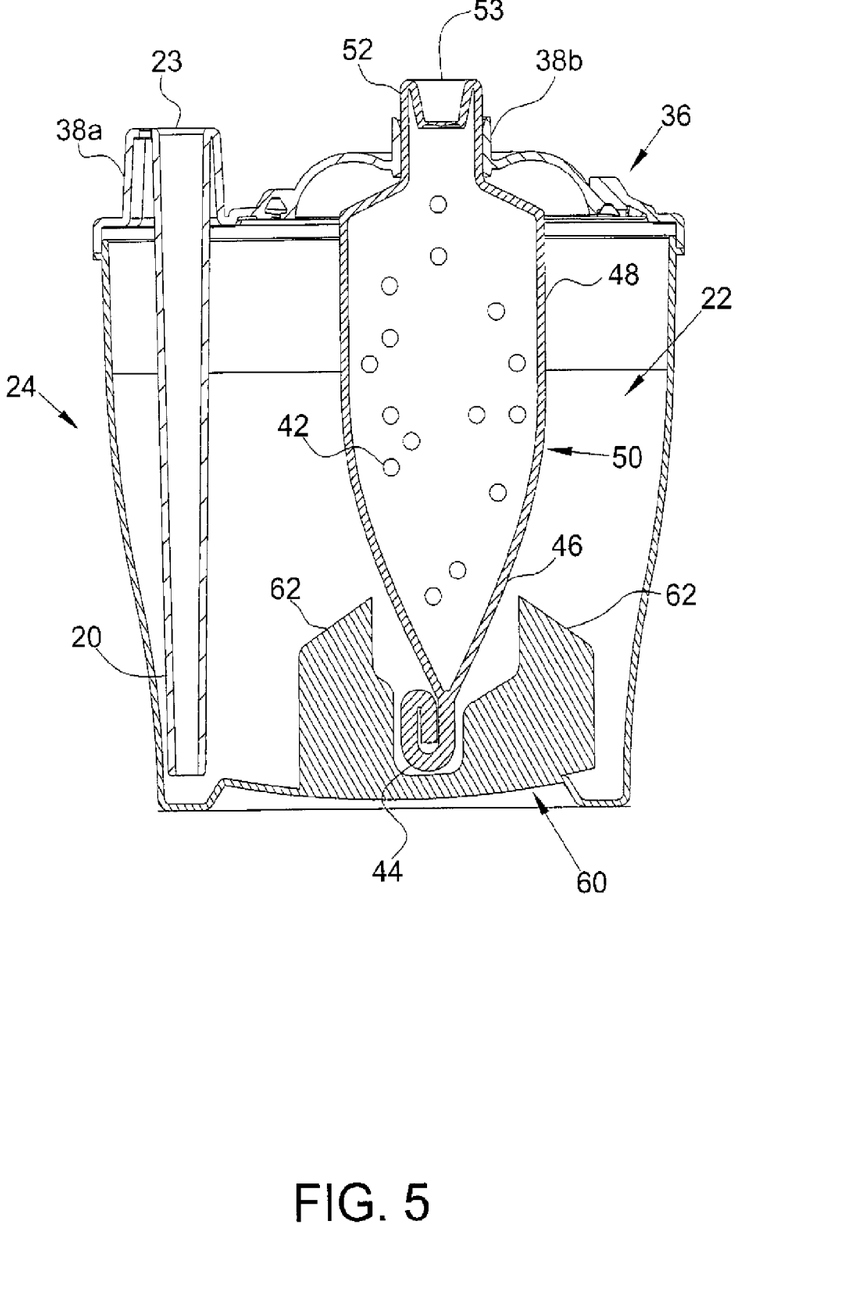
FIG. 5 is a cross-section view of the tube brewing element and cup from FIG. 4.

FIG. 5 is a cross-section view of the tube brewing element and cup from FIG. 4.

Cup 24 comprises a dispenser means 60 having at least one pair of sharp, punching ribs 62 in close proximity to the lower, distal end 46 of tube 50. Cup 24 is pre-filled with a measured quantity of potable liquid 22, such as treated water, which is pumped out and recycled via suction tube 20 attached to cover 36 when cup 24 is attached to a typical espresso machine (see FIG. 2) and the machine is operated. Suction tube 20 is initially sealed with a thin membrane 23 which is punctured mechanically by the operation of the espresso machine.

Suction tube 20 acts like a straw and can be used to drink the finished brew through lip 38a formed in cover 36. Note that tube 50 has a folded end 44 which provides a hermetic seal for the dry brewing ingredients 42, such as ground coffee, which are kept separate from potable liquid 22. Protruding from cover 36 is an inlet tube 52 for allowing return of the potable liquid 22 into the cup 36 from the espresso machine. The inlet tube 52 is formed with a punchable membrane 53 which is mechanically punched when cup 24 is attached to the outlet of the espresso machine, as shown in FIG. 2.

Figure 6:
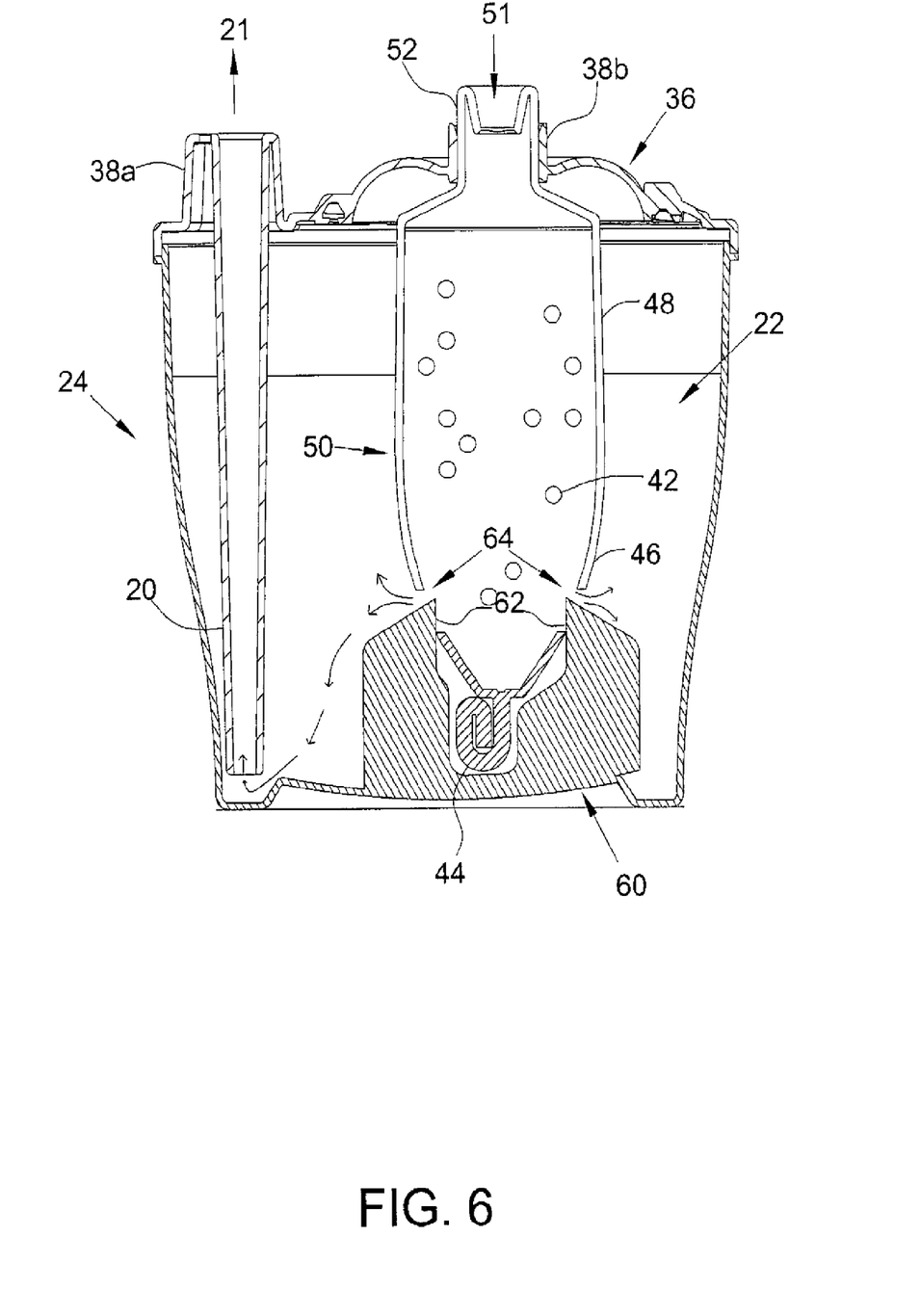
FIG. 6 is a cross-section view of the cup and brewing element from FIG. 5 shown after hot pressurized water is admitted into the inlet of the tube-shaped brewing element.

FIG. 6 is a cross-section view of the cup and brewing element from FIG. 5 shown after hot pressurized water is admitted into the inlet of the tube-shaped brewing element.

When a user inserts a drinking container, such as cup 24, into an espresso machine (not shown) and the machine is operated, the potable base liquid, such as treated water 22, within cup 24 is drawn up (arrow 21) through suction tube 20 into the espresso machine and heated and then returned (arrow 51) through inlet tube 38b in a pressurized form through the narrow, inlet tube 52 to tube brewing element 50.

Tube 50 contains one or more dry brewing ingredients 42, such as ground coffee. The brewing ingredients 42 generally mix thoroughly with recycled water, but only in a protected environment. The high pressure also causes the lower, distal end 46 of the tube 50 to come into direct contact with at least one pair of punching ribs 62 advantageously formed integrally at the bottom of cup 24. These punching ribs 62 puncture the aluminum in one or more places 64 and perforate the distal end 46 of tube 50 so that the espresso brew (shown by a series of arrows) is released downward and radially into cup 24 through the perforations made.

When cup 24 is removed from the espresso machine, a convenient drinking lip 38a is provided on the cover 36, which allows a user to drink the finished brew while it is hot and ready by sucking up the finished brew through suction tube 20, which acts as a straw. Alternatively, the finished brew is drunk using one or more openings conveniently provided in cover 36 for this purpose. Disposal of the empty cup 24 is quick, sanitary, and efficient since discarding cup 24 with any remaining contents can be done without the need for wiping up spills as is necessary when using ordinary porcelain cups. Furthermore, ordinary cups, unlike the one-time use portable cup 24, require cleaning and a thorough washing up for later reuse.

Having described the invention with regard to certain specific embodiments thereof, it is understood that the description is not meant as a limitation, since further modifications will now suggest themselves to those skilled in the art, and it is intended to cover such modifications as fall within the scope of the attached claims.

I claim:

1. A portable beverage preparation device comprising:
   a sealed drink container having a central inlet and having a bottom wall, said sealed drink container containing a predetermined volume of a potable base liquid;
   a capsule brewing element disposed within said sealed drink container comprising at least one sealed compartment having a predetermined quantity of at least one beverage preparation contained therein,
   wherein said sealed compartment of said capsule brewing element comprises a tube formed of a single piece of material,
   said tube comprising a nipple inlet integrally formed with a punchable membrane at a proximal end thereof being connected to said central inlet, such that said tube extends within said sealed drink container with its distal end spaced apart from said sealed drink container bottom wall,
   said tube being formed so as to withstand internal pressure; and
   an automatic dispenser means for dispersing said at least one beverage preparation into said sealed drink container;
   such that when said sealed drink container is connected to an operating espresso system, said base liquid is drawn from said sealed drink container into said operating espresso system and heated therein and returned via said central inlet to said sealed drink container as pressurized liquid,
said pressurized liquid mixing evenly with said at least one beverage preparation, and engorging and stretching said tube to activate said automatic dispenser means which punctures said tube at its distal end and disperses said mixed brew into said sealed drink container.

2. The portable beverage preparation device of claim 1 wherein said sealed drink container is a cup.

3. The portable beverage preparation device of claim 1 wherein said potable base liquid is water.

4. The portable beverage preparation device of claim 1 wherein said capsule brewing element is formed free-standing.

5. The portable beverage preparation device of claim 1 wherein said tube has a length relatively bigger than the diameter of said tube.

6. The portable beverage preparation device of claim 1 wherein said tube is disposed within said drink container in an upright orientation in close proximity to said dispenser means.

7. The portable beverage preparation device of claim 1 wherein said tube is separated by at least one thin membrane from said dispenser means.

8. The portable beverage preparation device of claim 1 wherein said tube is formed from aluminum.

9. The portable beverage preparation device of claim 1 wherein said distal end is hermetically sealed by being folded over upon itself to form a sealed end.

10. The portable beverage preparation device of claim 9 wherein said sealed end comprises said dispenser means, said sealed end being made to unfold when pressurized liquid fills and engorges said tube brewing element allowing dispersal of said mixed brew contained therein to disperse within said drink container.

11. The portable beverage preparation device of claim 1 wherein said dispenser means comprises a series of radial perforations formed in the outside envelope of said capsule brewing element for dispensing said mixed brew when pressurized liquid is introduced into said capsule brewing element.

12. The portable beverage preparation device of claim 1 wherein said dispenser means comprises a punching element.

13. The portable beverage preparation device of claim 12 wherein said punching element comprises at least one punching rib for inwardly perforating said capsule brewing element when high pressure water engorges said capsule and causes said distal end of said tube to expand.

14. The portable beverage preparation device of claim 1 wherein said brewing material is provided in pre-measured quantities via a pre-filled capsule insertable into said tube.

15. The portable beverage preparation device of claim 14 wherein said pre-filled capsule is formed with multiple chambers for storing different comestible materials insertable together into said tube to make said mixed brew.

\* \* \* \* \*